United States Patent [19]

Yamamoto et al.

[11] Patent Number: 4,740,692

[45] Date of Patent: Apr. 26, 1988

[54] LASER MASS SPECTROSCOPIC ANALYZER AND METHOD

[75] Inventors: Takashi Yamamoto; Noriyuki Mizuta; Tadatoshi Yamada; Akira Ishimori, all of Hyogo, Japan

[73] Assignee: Mitsubishi Denki Kabushiki Kaisha, Tokyo, Japan

[21] Appl. No.: 873,376

[22] Filed: Jun. 12, 1986

[30] Foreign Application Priority Data

Jun. 13, 1985 [JP] Japan .................................. 60-127251
Mar. 20, 1986 [JP] Japan .................................. 61-62713

[51] Int. Cl.[4] .................................................. B01D 59/44

[52] U.S. Cl. .................................. 250/282; 250/423 P; 250/288

[58] Field of Search ..................... 250/423 P, 281, 288, 250/396 R, 282

[56] References Cited

U.S. PATENT DOCUMENTS 3,187,179 6/1965 Craig et al. ......................... 250/288
3,644,731 2/1972 Eloy ...................................... 250/288
4,255,661 3/1981 Liebl .................................. 250/396 R
4,296,322 10/1981 Wechsung ........................ 250/423 P
4,330,208 5/1982 Eloy ...................................... 250/288
4,527,059 7/1985 Benninghoven et al. .......... 250/288
4,633,084 12/1986 Gruen et al. ..................... 250/423 P

*Primary Examiner*—Bruce C. Anderson
*Attorney, Agent, or Firm*—Bernard, Rothwell & Brown

[57] ABSTRACT

An apparatus for analyzing in a mass spectrograph ions contained in gas emitted from a sample upon application of a laser beam spot to the surface of the sample, the apparatus including a vacuum vessel which houses the mass spectrograph therein, a support structure which supports the sample outside the vacuum vessel, a first laser irradiation device for applying a first laser beam to the surface of the sample, and a second laser irradiation device for applying a second laser beam to the flow of gas generated from the sample and flowing toward the mass spectrograph in the vacuum vessel through a nozzle provided in the same vessel.

16 Claims, 6 Drawing Sheets

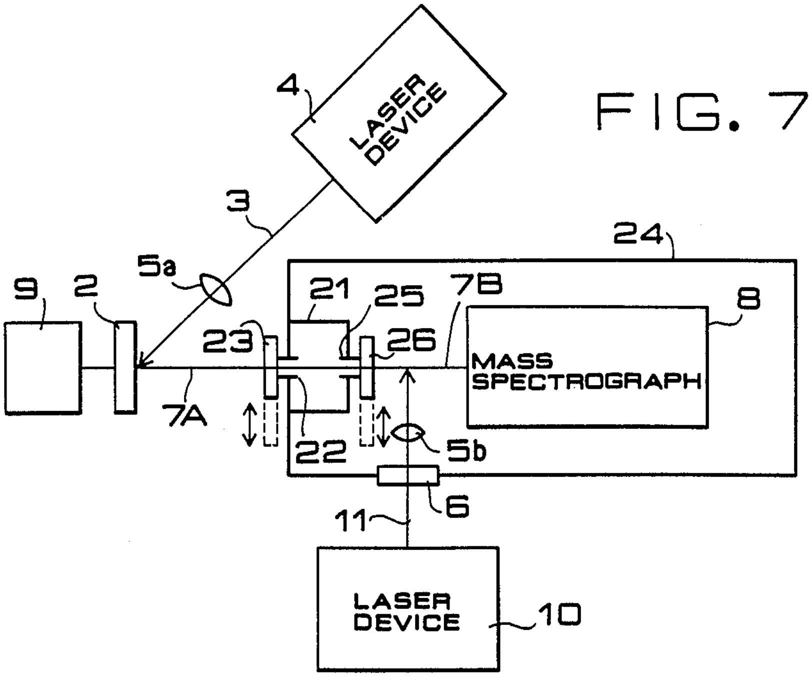
FIG. 7
FIG. 13
(PRIOR ART)
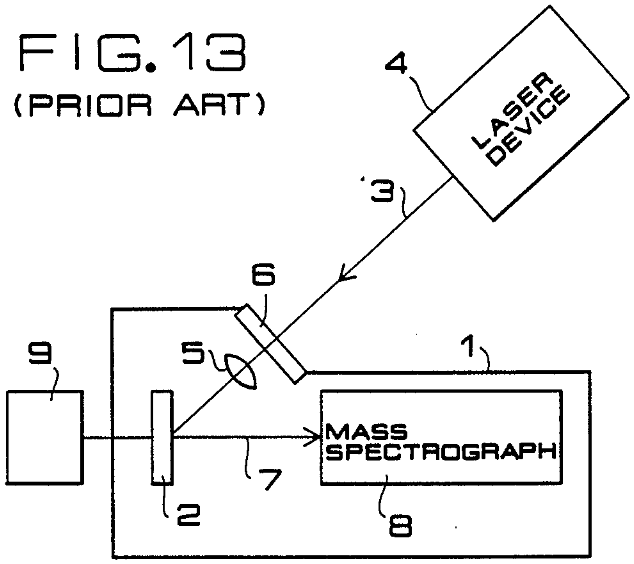

LASER MASS SPECTROSCOPIC ANALYZER AND METHOD

BACKGROUND OF THE INVENTION

1. Field of the Invention

The present invention relates to a laser mass spectroscopic analyzer for mass spectroscopic analysis of ions separated from solids or liquids and more particularly to a laser mass spectroscopic analyzer and method capable of analyzing a sample located outside a vacuum vessel.

2. Description of the Prior Art

FIG. 13 is a schematic construction diagram of a conventional laser microprobe mass spectroscopic analyzer shown, for example, in Japanese Patent Laid-Open Application No. 66245/1983, in which the reference numeral 1 denotes a vacuum vessel; numeral 2 denotes a sample placed within the vacuum vessel 1; numeral 3 denotes a laser beam emitted from a laser device 4; numeral 5 denotes a focusing lens for focusing the laser beam 3 into a fine spot; numeral 6 denotes a window (e.g. glass window) for conducting the laser beam 3 into the vacuum vessel 1; numeral 7 denotes secondary particles such as ions and neutral particles (atoms and molecules) generated by the radiation of laser onto the surface of the sample 2; numeral 8 denotes a mass spectrograph for mass spectrometric analysis of ions; and numeral 9 denotes a sample inching device for inching the sample to conform the portion to be analyzed to a focused spot of the laser beam.

The operation of such conventional analyzer will be described below.

The laser beam 3 emitted from the laser device 4 passes through the window 6 attached to the vacuum vessel 1 and is conducted into the same vessel, in which the beam is focused as a fine spot on the surface of the sample 2 placed within the vacuum vessel. By this focused radiation of the laser beam 3 the secondary particles 7 such as neutral particles, e.g. atoms and molecules, electrons and ions (charged particles) are emitted from a very small region on the surface of the sample 2. Among the secondary particles 7, ions as charged particles are introduced into the mass spectrograph 8 for mass spectrometric analysis, whereby there are performed elementary analysis and structural analysis for the very small region of the sample 2. Since the average free stroke of ions is smaller than 1 $\mu$m in the air, ions are scattered and their electric charge lost by impingement against gas molecules, etc. To avoid this, the mass spectrometric analysis in this conventional apparatus premises that the sample 2 should be placed in vacuum.

In the conventional laser mass spectrometric analyzer constructed as above, sampling and ionization of the sample 2 are performed at a time by a single radiation of laser beam, so it is necessary to place the sample 2 within the vacuum vessel 1 in which is disposed the mass spectrograph, and for controlling the position of the sample 2 located in the vacuum vessel 1 it is necessary to use a special manipulator (goniostage) for vacuum as the supporting device 9, resulting in a high equipment cost. Moreover, the size of the sample 2 is restricted by the size of the vacuum vessel 1, and a liquid sample or a sample having a high vapor pressure is impossible or difficult to analyze. Further, it has been impossible to analyze living things alive in vacuum. Additionally, at the time of change of sample it is necessary to release the vacuum and the sample changing time becomes longer because of vacuum exhaustion.

The present invention has been accomplished for solving the above-mentioned problems and provides a laser mass spectrometric analyzer capable of analyzing a sample placed outside a vacuum vessel.

SUMMARY OF THE INVENTION

According to the principle of the present invention, a sample for mass spectrometric analysis is irradiated with a laser beam outside a vacuum vessel which contains a mass spectrograph. A gaseous substance emitted from the sample by that irradiation is conducted into the vacuum vessel through a nozzle attached to the same vessel and advances toward the mass spectrograph. During this process, it is irradiated with another laser beam whereby neutral particles in the gaseous substance are ionized.

In one aspect of the present invention, the mass spectrometric analyzer, which is for making a mass spectrometric analysis in a certain limited region on the surface of a sample, is provided with:

a vacuum vessel which houses a mass spectrograph therein;

a support means for supporting the sample in a desired position outside the vacuum vessel;

a first irradiation means for applying a first laser beam to a desired region on the surface of the sample to thereby gasify a part of the sample in the said region;

a nozzle provided through the wall of the vacuum vessel to introduce the gasified sample into the vacuum vessel for analysis in the mass spectrograph; and a second irradiation means for applying a second laser beam to the flow of the above gasified sample flowing from the nozzle to the mass spectrograph.

According to the construction of the present invention, neutral particles created by the gasification of a sample are conducted through an introducing vessel into the vacuum vessel, thereby making it possible to prevent lowering of the degree of vacuum in the vacuum vessel and make a mass spectrometric analysis of a high accuracy.

In one mode of the present invention, the laser mass spectrometric analyzer may be further provided with a shutter which opens the nozzle during radiation of a laser beam and closes it when the laser beam is not radiated. By closing the nozzle during non-irradiation there can be obtained the advantage that the lowering of the degree of vacuum in the vacuum vessel can be reduced.

In another mode of the present invention, the laser mass spectrometric analyzer may be further provided with an introducing nozzle for introducing therein of gas emitted from the sample, an introducing chamber for storing the introduced gas therein, and a discharge nozzle for conducting the gas in the introducing chamber to the mass spectrograph. The introducing nozzle and the discharge nozzle are each opened and closed by the shutter in accordance with an analyzing operation sequence.

The first laser beam may be directed to the surface of the sample from a laser device provided outside the vacuum vessel, or it may be directed to the sample surface through a nozzle by the use of a suitable optical system which includes a mirror or a prism.

BRIEF DESCRIPTION OF THE DRAWINGS

FIG. 7 is a sectional view of a laser mass spectrometric analyzer according to another embodiment of the present invention;

FIG. 13 is a sectional view of a conventional laser mass spectrometric analyzer.

DETAILED DESCRIPTION OF THE PREFERRED EMBODIMENTS

Figure 1:
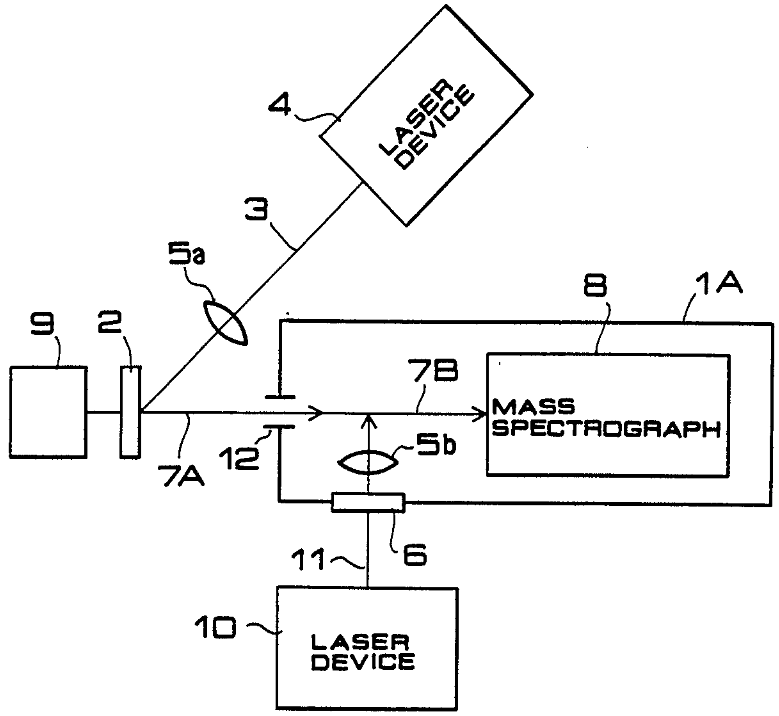
FIG. 1 is a schematic sectional view of a laser mass spectrometric analyzer according to an embodiment of the present invention.

In FIG. 1, the reference numeral 1A denotes a vacuum vessel; numeral 2 denotes a sample placed outside the vacuum vessel 1A; numeral 3 denotes a laser beam emitted from a laser device 4; numeral 5*a* denotes a focusing lens for focusing the laser beam 3 into a fine spot; numeral 6 denotes a window for conducting a laser beam 11 emitted from a second laser device 10 into the vacuum vessel 1; numeral 5*b* denotes a focusing lens for focusing the laser beam 11.

Numeral 7A denotes neutral particles (atoms and molecules) created by focusing of the laser beam 3 onto the sample 2; and numeral 12 denotes a nozzle provided in the vacuum vessel 1A to introduce the neutral particles 7A into the same vessel.

Further, numeral 7B denotes ions generated by a focusing radiation of the laser beam 11 onto the neutral particles 7A; numeral 8 denotes a known mass spectrograph; and numeral 9 denotes a sample supporting device which effects positioning of the sample 2. As the sample 2 there may be used a solid, a liquid, or any other substance.

The operation of this laser mass spectrometric analyzer will now be explained. The laser beam 3 emitted from the laser device 4 is focused as a fine spot of 0.5 to several $\mu m$ in diameter onto the surface of the sample 2 placed outside the vacuum vessel 1A, by means of the focusing lens 5*a*. As a result of this laser application to the sample 2, the neutral particles 7A as well as such charged particles as electrons and ions 7B are emitted from the sample 2. Since the average free stroke of these neutral particles 7A and charged particles outside the vacuum vessel 1A is very small, they immediately impinge upon gas molecules and are thereby scattered and their electric charges are lost, with the result that the neutral particles 7A predominate. That is, the sample 2 is gasified. The neutral particles 7A (atoms and molecules) are introduced into the vacuum vessel 1A through the nozzle 12 provided in the same vessel and are ionized by the focused radiation of the laser beam 11 from the second laser device 10. The ions 7B are subjected to a mass spectrometric analysis in the mass spectrograph 8 mounted within the vacuum vessel 1A, whereby there are performed elementary analysis and structural analysis of the sample 2. In this way, by the focused radiation of the laser beam 3 to the sample 2 the sample is decomposed to the level of atoms and molecules and evaporated, then the evaporated neutral particles are introduced into the vacuum vessel 1A through the nozzle 12 and thereafter ionized by the laser beam 11, whereby it is made possible to effect the above analysis while placing the sample 2 outside and not within the vacuum vessel 1A.

Figure 2:
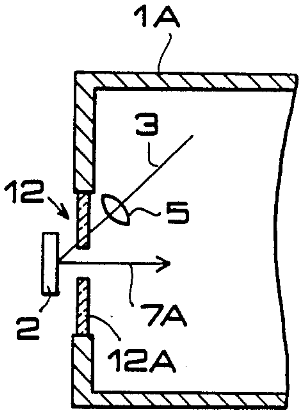
FIG. 2 a sectional view showing a nozzle used therein.
Figure 3:
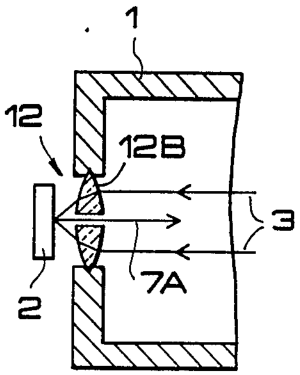
FIG. 3 is a sectional view including another form of a nozzle.

In this case, in order that the neutral particles 7A created by the radiation of laser may be introduced efficiently into the vacuum vessel 1A, it is necessary to enlarge the solid angle of the bore of the nozzle 12 relative to the laser focused spot. As means for realizing this, there are (A) a method of setting small the distance between the sample 2 and the nozzle 12 and (B) a method of making large the nozzle bore. According to the method (A), it is generally difficult to effect a focused radiation of laser. To solve this problem there may be used a light transmitting plate 12A formed of a laser beam transmitting material, as shown in FIG. 2. Moreover, for focusing laser as a fine spot it is necessary that the focusing lens 5A be of a short focal distance and there inevitably arises the need of disposing the focusing lens 5A in the vicinity of the sample. These problems can be overcome if the lens 12 is constituted by a focusing lens 12B as shown in FIG. 3.

Figure 4:
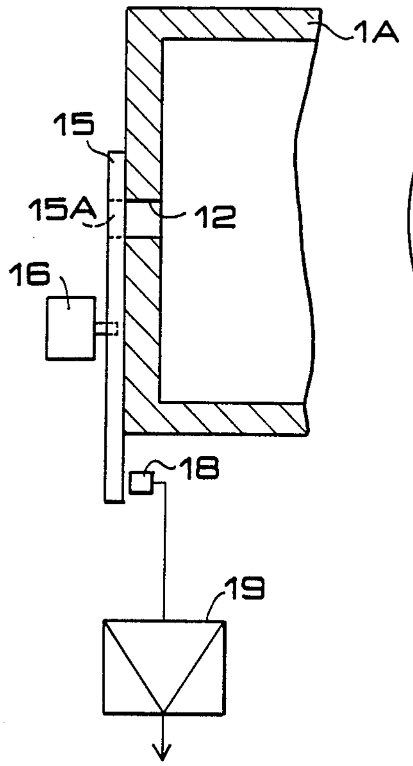
FIG. 4 is a side view showing a nozzle opening/closing shutter.
Figure 5:
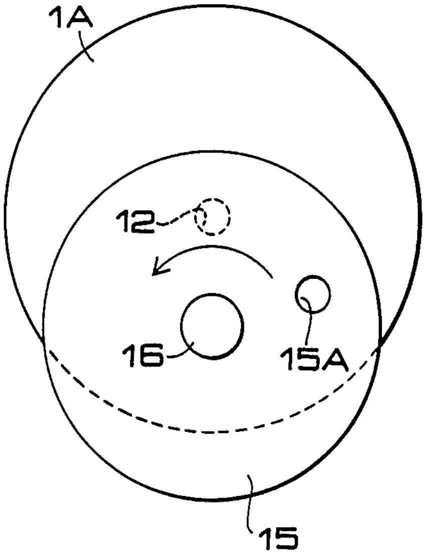
FIG. 5 is a front view of the shutter of FIG. 4.

On the other hand, in the method (B), the larger the bore of the nozzle 12, the larger the load imposed on the vacuum exhaustion pump for maintaining the degree of vacuum required. In this connection, if the nozzle 12 is opened and closed selectively in accordance with a pulse signal in synchronism with the radiation of the laser beam 3, by means of a shutter means attached to the nozzle 12 and the above analyzing operation is performed only during opening of the nozzle, then the above load on the pump can be reduced to a great extent. FIGS. 4 and 5 show an example of a structure of the shutter means, in which the numeral 15 denotes a disc-like shutter plate driven by a motor 16. The shutter plate 15 is formed with a through hole 15A which opens and communicates with the nozzle 12 on the side of the vacuum vessel 1 intermittently with rotation of the shutter plate 15. The communication between the nozzle 12 and the through hole 15A permits introduction of the neutral particles 7A into the vacuum vessel 1A. A revolution signal is taken out through an amplifier 19 from a sensor 18 which detects a rotational position of the shutter plate 15, then a synchronizing signal is generated on the basis of the signal thus taken out, and the radiation timing of each of the laser beams 3 and 11 is matched to the synchronizing signal.

Figure 6:
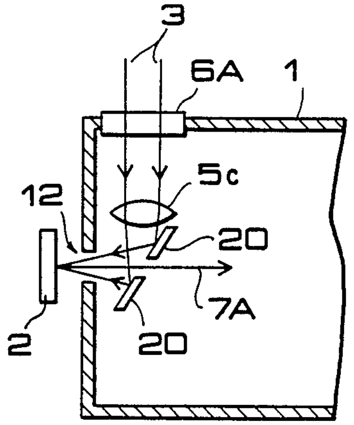
FIG. 6 is a sectional view showing a part of the apparatus in which a first laser beam is directed through a nozzle to a sample.

Other than the method of directing the laser beam to the sample located outside the vacuum vessel 1A as in the above embodiment, there may be adopted a method as shown in FIG. 6 in which the laser beam 3 is introduced into the vacuum vessel 1A through a window 6A and then directed to the sample 2 placed outside the vacuum vessel 1A from the interior of the same vessel through a focusing lens 5*c* and a reflecting mirror 20 which are disposed within the vessel 1A.

The first laser device 4 and the second laser device 10 may be constituted as a single or the same laser device, and also in this case there can be obtained the same function and effect as above.

Referring now to FIG. 7, there is illustrated a laser mass spectrometric analyzer according to another embodiment of the present invention, which is provided with another type of shutter means. In FIG. 7, numeral 21 denotes an introducing vessel for introducing neutral particles which are produced at the time of sample gasification; numeral 2 denotes a sample placed outside the introducing vessel 21; numeral 3 denotes a laser beam emitted from a first laser device 4; numeral 5*a* denotes a focusing lens for condensing the laser beam 3 into a fine spot; numeral 6 denotes a window for conducting a laser beam 11 emitted from a second laser device 10 into the interior of a vacuum vessel 24; numeral 5*b* denotes a focusing lens for condensing the laser beam 11; numeral 7A denotes neutral particles (atoms and molecules) created by the focused radiation of the laser beam 3; numeral 22 denotes an introducing nozzle for introducing the neutral particles 7A into the introducing vessel 21; numeral 23 denotes an introducing shutter for opening and closing the introducing nozzle 22; numeral 24 denotes a vacuum vessel; numeral 25 denotes a discharge nozzle for discharging the neutral particles 7A from the introducing vessel 21 into the vacuum vessel 24; numeral 26 denotes a discharge shutter which opens and closes the discharge nozzle 25; numeral 7B denotes ions (charged particles) created by focusing of the laser beam 11 onto the neutral particles 7A; and numeral 9 denotes a sample supporting device which effects positioning of the sample 2.

Figure 8:
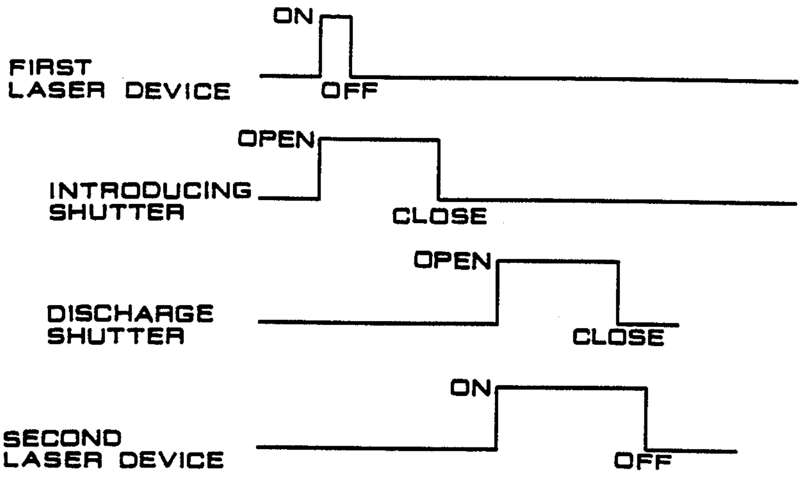
FIG. 8 is a timing chart of operations of components of the apparatus shown in FIG. 7.

The operation of the embodiment of the present invention shown in FIG. 7 will now be explained. Usually, the introducing shutter 23 is closed and the discharge shutter 26 opened, and the interior of the vacuum vessel 24 is maintained at a high vacuum. First, the discharge shutter 26 is closed and the laser beam 3 emitted from the first laser device 4 is focused onto the surface of the sample 2 by means of the focusing lens 5*a*, whereupon the introducing shutter 23 is opened. Consequently, the neutral particles 7A emitted from the sample 2 are conducted into the introducing vessel 21 through the introducing nozzle 22. Immediately thereafter the introducing shutter 23 is closed. Then, the discharge shutter 26 is opened, thereby allowing the neutral particles 7A in the introducing vessel 21 to be conducted into the vacuum vessel 24 through the discharge nozzle 25. Subsequently, the neutral particles 7A are ionized into charged particles 7B by the focused radiation of the laser beam 11 from the second laser device 10. The charged particles 7B are subjected to a mass spectrometric analysis in a mass spectrograph 8 which is provided within the vacuum vessel. 24, whereby there is performed an elementary analysis of the sample 2. The operations of the first laser device 4, introducing shutter 23, discharge shutter 26 and second laser device 10 are shown as a timing chart in FIG. 8.

Usually, a degree of vacuum higher than $10^{-4}$ torr. is required for mass spectrometric analysis of ions or charged particles, and here the interior of the vacuum vessel 24 must be held at a high vacuum. In FIG. 7, the degree of vacuum in the introducing vessel 21 and that in the vacuum vessel 24 are reduced upon opening of the introducing shutter 23 and the discharge shutter 26. In this case, a large amount of air flows into the introducing vessel 21, while only the gas in the vessel 21 flows into the vacuum vessel 24. Therefore, by greatly reducing the capacity of the introducing vessel 21 it is made possible to minimize the lowering of the degree of vacuum in the vacuum vessel 24.

Figure 9:
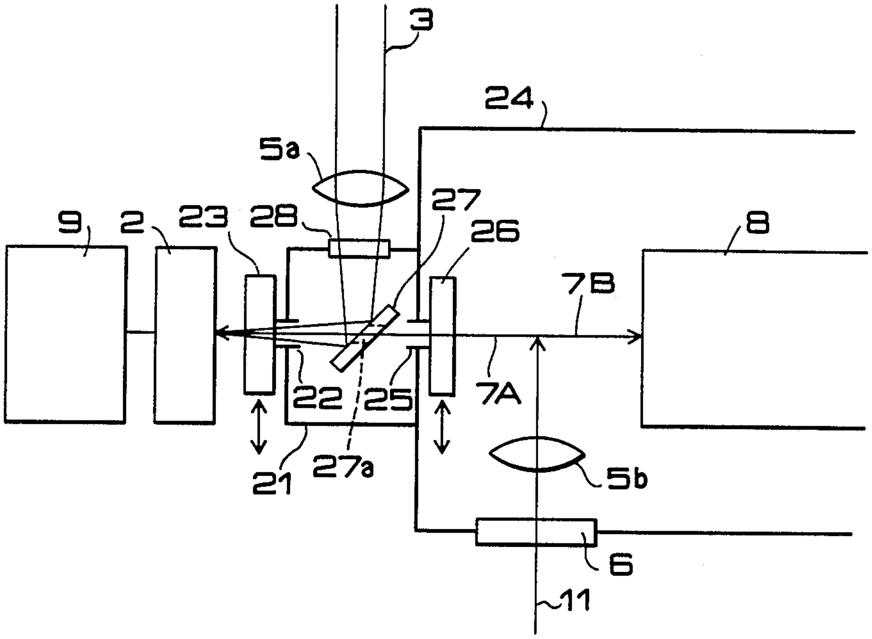
FIG. 9 is a sectional view of a laser mass spectrometric analyzer according to a further embodiment of the present invention.

A further embodiment of the present invention will now be described. Although in the above embodiment the laser beam 3 from the first laser device 4 is applied to the sample 2 obliquely from the outside of the introducing vessel 21 and the vacuum vessel 24, it may be directed to the sample 2 from the interior of the introducing vessel 21 or the vacuum vessel 24, whereby the sample 9 can be placed closer to the introducing nozzle 22 and the neutral particles 7A can be introduced efficiently into the introducing vessel 21. FIG. 9 illustrates this embodiment, in which the numeral 28 denotes a window for introducing the laser beam 3 into the introducing vessel 21, and numeral 27 denotes a laser beam reflecting mirror disposed within the introducing vessel 21 for reflecting the laser beam 3 toward the sample 2, the mirror 27 being adjusted so that the laser beam is focused on the sample 2. The laser beam reflecting mirror 27 is centrally formed with a hole 27*a* so that the neutral particles 7A introduced from the introducing nozzle 22 and to be discharged from the discharge nozzle 25 can pass smoothly through the interior of the vessel 21.

Figure 10:
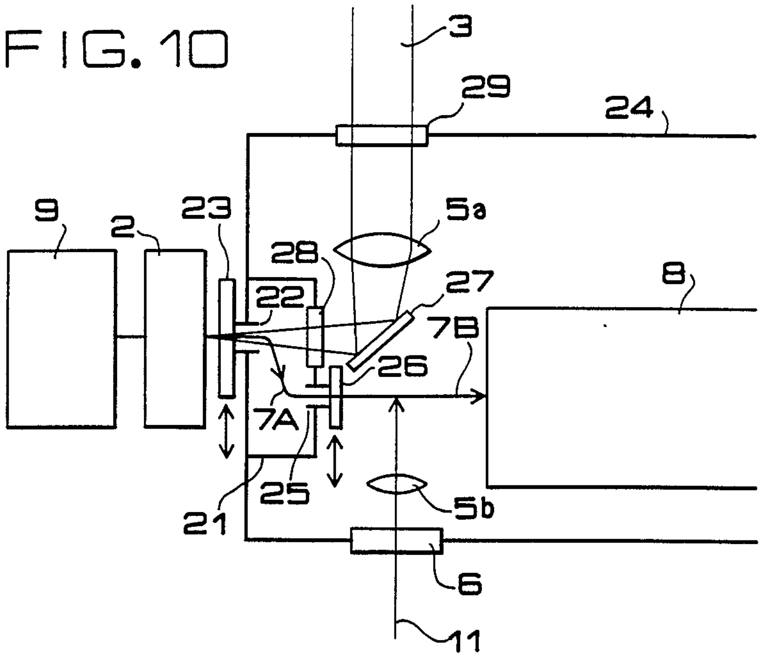
FIG. 10 a sectional view showing a modified embodiment of the invention.

Referring now to FIG. 10, there is illustrated a modified embodiment of the present invention, in which the laser beam reflecting mirror 27 is disposed within the vacuum vessel 24. The numeral 29 in the figure denotes a window for conducting the laser beam 3 into the vacuum vessel 24. In the embodiment shown in FIG. 7 the introducing nozzle 22 and the discharge nozzle 25 are aligned, while in the modified embodiment being considered both are dislocated from each other because in the partition wall of the introducing vessel 21 there is formed a window 28 for directing the laser beam reflected by the reflecting mirror 27 toward the sample 2 through the introducing nozzle 22. In this modification, therefore, it is not necessary to form a central hole in the mirror 27. Further, as is apparent from the comparison between FIGS. 9 and 10, in the embodiment of FIG. 10 the introducing vessel 21 does not project from the end wall of the vacuum vessel 24, so despite of a closely adjacent construction of the sample 2 relative to the introducing nozzle 22, it is possible to prevent the increase in size of the apparatus.

Figure 11:
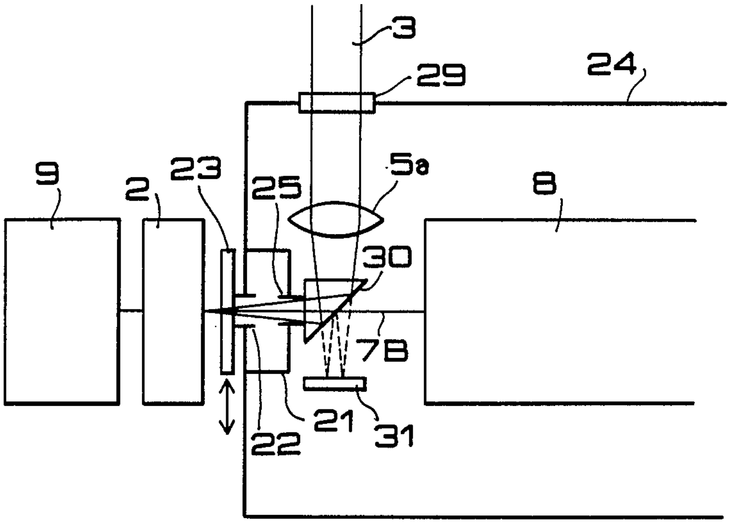
FIG. 11 is a sectional view showing a further modified embodiment of the invention.
Figure 12A:
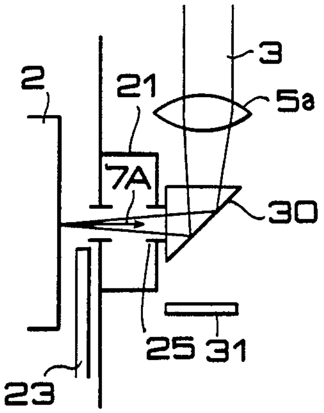
FIGS. 12(*a*) to (*d*) show different stages in the operation of the apparatus of FIG. 11.
Figure 12B:
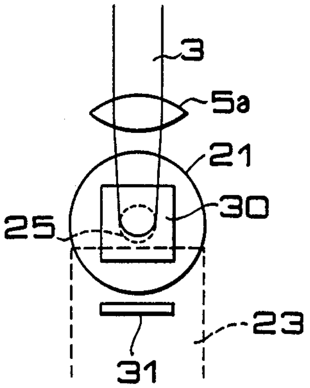
Figure 12C:
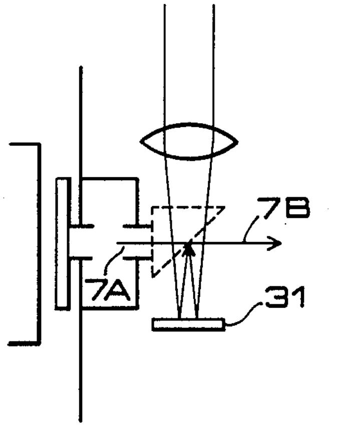
Figure 12D:
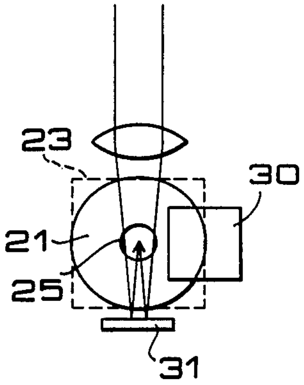

Another modified embodiment of the present invention will now be described with reference to FIGS. 11 and 2(*a*) to (*d*). FIGS. 12(*b*) and (*d*) are side views of FIGS. 12(*a*) and (*c*), respectively. This modified embodiment is so constructed as to perform the gasification of the sample 2 and the ionization of the neutral particles 7A by the use of only one laser device. In FIG. 11, a discharge nozzle 25 is disposed on an axial extension of the introducing nozzle 22 and a movable prism 30 is in contact with an opening face of the discharge nozzle 25 to close the latter. The movable prism 30 not only serves to refract the laser beam 3 and focus it to the sample 2 but also serves as the discharge shutter 26 used in the embodiments of FIGS. 7 and 10. Numeral 31 denotes a laser beam reflecting mirror for setting a focal position of the laser beam 3 in the vicinity of the outlet of nozzle 25.

At the beginning the introducing shutter 23 and the movable prism 30 close the introducing nozzle 22 and the discharge nozzle 25, respectively, but, as shown in FIGS. 12(*a*) and (*b*), the shutter 23 opens upon emission of the laser beam 3, so that the laser beam 3 is condensed by the lens 5*a* and then refracted and focused to the sample 2 by means of the movable prism 30, whereby there is performed the radiation of laser to the sample 2. The resulting neutral particles are introduced through the introducing nozzle 22 into the introducing vessel 21 and thereafter the introducing shutter 23 is closed. Subsequently, as shown in FIGS. 12(*c*) and (*d*), the movable prism 30 moves away from the discharge nozzle 25, allowing the neutral particles in the introducing vessel 21 to be discharged into the vacuum vessel 24 through the discharge nozzle 25. At the same time, the laser beam 3 is emitted again and it is focused for ionization in the vicinity of the outlet of the discharge nozzle 25 through the lens 5*a* and the laser beam reflecting mirror 31. The neutral particles 7A, which are now charged particles 7B, are conducted to the mass spectrograph 8.

Although in the above-described embodiments illustrated in FIGS. 7 to 12 the interior of the introducing vessel 21 is held at a high vacuum at the beginning, there may be further provided a pressure regulator and a gas charging valve to precharge the interior of the vessel 21 with buffer gas (also called carrier gas). If the buffer gas pressure in the introducing vessel 21 is set approximately equal to the atmospheric pressure, the admission of the gaseous components in the air into the introducing vessel 21 is almost negligible even if the introducing shutter 23 is opened for a short time at the time of introduction of the neutral particles 7A. At this time, the neutral particles 7A created by applying the laser beam 3 to the sample 2 rush out like a jet from the surface of the sample 2, so that the gas pressure of the neutral particles 7A becomes larger than the atmospheric pressure and larger than the buffer gas pressure in the introducing vessel 21. Consequently, it becomes possible for the neutral particles 7A to flow into the vessel 21 and be captured, and there is performed the same analysis as previously described. In this case, the buffer gas component may act as a background noise source in the mass spectrometric analysis, but this background noise can be easily eliminated by selecting as the buffer gas a chemically stable argon gas or rare gas, or a gas whose mass spectrum is known and easy to separate from the mass spectrum of sample. Also by thus charging the interior of the introducing vessel 21 with the buffer gas in advance, the incorporation of the gas molecules present in the air can be diminished to a remarkable extent and the same effect as in the above embodiments is attainable.

According to the present invention, as set forth above, the sampling and the ion separation for the neutral particles created by the radiation of laser beam are separately performed inside and outside the vacuum vessel, respectively. Consequently, it becomes possible to effect a laser mass spectrometric analysis for any sample placed outside the vacuum vessel and the use of such expensive manipulator as in the prior art is no longer necessary. Besides, what is required is only selecting a sample out of various kinds of solids, liquids, gases, other substances and living things and placing it in a predetermined position in the air, whereby a mass spectrometric analysis of ions thereof can be performed easily and less expensively.

What is claimed is:

1. A method of conducting a mass spectrometric analysis of a sample comprising the steps of:

(a) supporting the sample in a substantially non-vacuum environment outside of a vacuum vessel which houses therein a mass spectrometer;

(b) irradiating a selected region of the surface of said sample with a laser beam to ionize a portion of said sample;

(c) permitting said ionized sample portion to interact with gas molecules in said substantially non-vacuum environment to form a gasified sample in which neutral particles predominate;

(d) introducing said gasified sample into the vacuum environment within said vacuum vessel;

(e) irradiating said gasified sample in said vacuum vessel with a laser beam to re-ionize the neutral particles in said gasified sample; and (f) thereafter subjecting the re-ionized gasified sample to mass spectrometric analysis within said vacuum vessel.

2. An apparatus for a mass spectrometric analysis for a certain limited region on the surface of a sample, said apparatus including:

a vacuum vessel which houses a mass spectrograph therein;

a means for supporting said sample in a desired position outside said vacuum vessel;

a first irradiation means for applying a first laser beam to a desired region on the surface of said sample to thereby gasify a part of said sample in said region;

a nozzle provided through the wall of said vacuum vessel and positioned relative to said sample supporting means to introduce said gasified sample into said vacuum vessel for mass spectrometric analysis by said mass spectrograph;

a second irradiation means for applying a second laser beam to the flow of said gasified sample flowing from said nozzle into said mass spectrograph to ionize the neutral particles therein; and a shutter means which opens said nozzle only during radiation of said first and second laser beams.

3. The apparatus of claim 2, wherein said shutter means includes a rotary disc having a through hole, said through hole being aligned with said nozzle when said disc is in a predetermined certain angular position, thereby forming a passage which permits said gasified sample to pass therethrough.

4. The apparatus of claim 2, further comprising a sensor for detecting a rotational position of said rotary disc, the rotational position of said disc being controlled in synchronism with the radiation of said first and second laser beams in accordance with an output signal provided from said sensor.

5. The apparatus of claim 2, wherein said first laser beam irradiation means comprises a first laser device and a focusing means for focusing a laser beam emitted from said first laser device onto said desired region on the surface of said sample, and said second laser beam irradiation means comprises a second laser device and a focusing means for focusing a second laser beam onto the flow of said gasified sample in said vacuum vessel.

6. The apparatus of claim 2, wherein said first laser beam irradiation means is disposed outside said vacuum vessel.

7. The apparatus of claim 2, wherein the laser beam from said first irradiation means is directed from said vacuum vessel to the surface of said sample through said nozzle.

8. The apparatus of claim 7, wherein said nozzle comprises a hole provided in a plate formed of a material capable of transmitting said first laser beam, and said first laser beam is directed to the surface of said sample through said plate.

9. The apparatus of claim 7, wherein said nozzle comprises a hole centrally provided in a focusing lens formed of a material capable of transmitting said first laser beam, and said first laser beam is focused on the surface of said sample through said focusing lens.

10. The apparatus of claim 7, which further comprises a reflecting mirror having a central hole, said reflecting mirror being disposed in opposed relation to said nozzle within said vacuum vessel, and wherein said first laser beam is reflected by said reflecting mirror and then directed to the surface of said sample through said nozzle, and said gasified sample introduced into said vacuum vessel through said nozzle is directed to said mass spectrograph through said hole of said reflecting mirror.

11. An apparatus for a mass spectrometric analysis for a certain limited region on the surface of a sample, said apparatus including:

- a vacuum vessel which houses a mass spectrograph therein;
- a means for supporting said sample in a desired position outside said vacuum vessel;
- a first irradiation means for applying a first laser beam to a desired region on the surface of said sample to thereby gasify a part of said sample in said region;
- an introducing nozzle provided through the wall of said vacuum vessel to introduce said gasified sample into said vacuum vessel for mass spectrometric analysis by said mass spectrograph;
- an introducing chamber provided within said vacuum vessel and communicating with said introducing nozzle;
- a discharge nozzle formed in a partition wall of said introducing chamber whereby said gasified sample received in said introducing chamber through said introducing nozzle is allowed to flow toward said mass spectrograph;
- an introducing shutter for opening and closing said introducing nozzle;
- a discharge shutter for opening and closing said discharge nozzle; and
- a second irradiation means for applying a second laser beam to the flow of said gasified sample flowing from said discharge nozzle into said mass spectrograph to ionize the neutral particles therein.

12. The apparatus of claim 11, wherein a window formed of a laser beam transmitting material is provided in said partition wall of said introducing chamber, and through said window said first laser beam is directed to said sample further through the interior of said introducing chamber and said introducing nozzle, and wherein said discharge nozzle is provided in a position offset from the axis of said introducing nozzle.

13. The apparatus of claim 12, wherein a window formed of a laser beam transmitting material is provided in the wall of said vacuum vessel to transmit therethrough said first laser beam emitted from an external laser device toward said sample.

14. An apparatus for a mass spectrometric analysis for a certain limited region on the surface of a sample, said apparatus including:

- a vacuum vessel which houses a mass spectrograph therein;
- a means for supporting said sample in a desired position outside said vacuum vessel;
- an introducing chamber positioned between said sample and said vacuum vessel, having an introducing nozzle on the side opposed to said sample, and communicating with the interior of said vacuum vessel through a discharge nozzle;
- an introducing shutter for opening and closing said introducing nozzle;
- a discharge shutter for opening and closing said discharge nozzle;
- a first laser beam irradiation means provided within said introducing chamber and having a mirror for receiving an externally provided first laser beam, directing it to a desired region on the surface of said sample through said introducing nozzle, thereby gasifying a part of said sample in said region; and
- a second irradiation means for applying a second laser beam to the gas flowing from said sample into said mass spectrograph through said introducing nozzle, said introducing chamber and said discharge nozzle to ionize the neutral particles therein.

15. The apparatus of claim 14, wherein said introducing nozzle and said discharge nozzle are disposed on the same straight line, and said mirror is disposed between both said nozzles and has a hole which permits the flow of gas flowing from said introducing nozzle toward said discharge nozzle.

16. An apparatus for a mass spectrometric analysis, for a certain limited region on the surface of a sample, said apparatus including:

- a vacuum vessel which houses a mass spectrograph therein;
- a means for supporting said sample in a desired position outside said vacuum vessel;
- an introducing chamber positioned between said sample and said vacuum vessel, having an introducing nozzle on the side opposite to said sample, and communicating with the interior of said vacuum vessel through a discharge nozzle;
- an introducing shutter for opening and closing said introducing nozzle;
- a laser beam irradiation means;
- a prism which is movable between one position to close said discharge nozzle and another position to open said discharge nozzle, and directs a laser beam from said laser beam irradiation means to a desired region on said sample to gasify part of said sample, while said prism is positioned at its closing position; and
- a mirror for reflecting said laser beam provided externally toward the flow of gas flowing from said discharge nozzle to said mass spectrograph to ionize the neutral particles therein, through said discharge nozzle, while said prism is in the position in which said discharge nozzle is opened.

* * * * *